(12) United States Patent
Shiono

(10) Patent No.: US 7,631,519 B2
(45) Date of Patent: Dec. 15, 2009

(54) OPTICAL FIBER DRAWING APPARATUS AND SEALING MECHANISM FOR THE SAME

(75) Inventor: Mitsuhiro Shiono, Hitachinaka (JP)

(73) Assignee: Hitachi Cable, Ltd., Tokyo (JP)

( * ) Notice: Subject to any disclaimer, the term of this patent is extended or adjusted under 35 U.S.C. 154(b) by 356 days.

(21) Appl. No.: 11/447,967

(22) Filed: Jun. 7, 2006

(65) Prior Publication Data

US 2006/0280578 A1 Dec. 14, 2006

(30) Foreign Application Priority Data

Jun. 10, 2005 (JP) ............... 2005-170419

(51) Int. Cl.
*C03B 37/01* (2006.01)
*C03B 37/02* (2006.01)
*C03B 37/085* (2006.01)

(52) U.S. Cl. .............. 65/495; 65/483; 65/537; 411/542

(58) Field of Classification Search .......... 65/495, 65/537; 411/542
See application file for complete search history.

(56) References Cited

U.S. PATENT DOCUMENTS

2002/0095955 A1  7/2002  Ball et al.

2004/0089025 A1 *  5/2004  Kuwahara et al. ............. 65/382

FOREIGN PATENT DOCUMENTS

| JP | 2002-537213 | 11/2002 |
| JP | 2004-161545 | 6/2004 |
| JP | 2006248842 A * | 9/2006 |
| WO | WO 2005096043 A1 * | 10/2005 |

* cited by examiner

Primary Examiner—Carlos Lopez
Assistant Examiner—Cynthia Szewczyk
(74) Attorney, Agent, or Firm—McGinn IP Law Group, PLLC

(57) ABSTRACT

An inner seal ring 16 is composed by connecting a plurality of inner seal ring pieces 16A, an outer seal ring 17 is composed by connecting a plurality of outer seal ring pieces 17A provided at an outer periphery of the inner seal ring 16, and a coil spring 18 is arranged at an outer periphery of the outer seal ring 17. The inner seal ring 16 and the outer seal ring 17 are piled for two or more stages, respectively. A connecting part of the inner seal ring pieces 16A and a connecting part of the outer seal ring pieces 17 are arranged not to overlap each other. An inner diameter of the inner seal ring 16 is variable in accordance with an outer diameter in vertical direction of a drawing-preform 1 by using a coil spring 18.

11 Claims, 5 Drawing Sheets

OPTICAL FIBER DRAWING APPARATUS AND SEALING MECHANISM FOR THE SAME

The present application is based on Japanese Patent Application No. 2005-170419 filed on Jun. 10, 2005, the entire contents of which are incorporated herein by reference.

BACKGROUND OF THE INVENTION

1. Field of the Invention

This invention relates to an optical fiber drawing apparatus, a sealing mechanism for the same, and a method for drawing an optical fiber, and more particularly, to an optical fiber drawing apparatus, a sealing mechanism for the same, and a method for drawing an optical fiber which has simple structure and can maintain the sealing property in a furnace tube even if variation in the outer diameter of the preform is large.

2. Description of the Related Art

FIG. 1 is a schematic illustration showing a conventional optical fiber drawing apparatus (drawing furnace).

An optical fiber drawing furnace 20 mainly comprises a furnace tube 21 to which an optical fiber drawing-preform 1 is inserted, a heater 22 for heating the inserted drawing-preform 1, an upper seal ring 24 and a lower seal ring 25 which prevent inert gas 23 in the furnace tube 21 from leaking to outside.

An optical fiber 2 is obtained by inserting the drawing-preform 1 into the furnace tube 21 made of carbon of the optical fiber drawing furnace 20, heating with the heater 22 to melt the drawing-preform 1, and drawing the melted drawing-preform 1. The drawing-preform 1 is gradually inserted to the optical fiber drawing furnace 20 at a predetermined speed in accordance with an optical fiber drawing speed and the diameter of the drawing-preform 1, and the inert gas 23 such as helium, argon is flown into the furnace tube 21.

Furnace temperature of the optical fiber furnace 20 reaches high temperature of about 2200° C. Therefore, a mechanism for keeping pressure inside the furnace tube 21 constant and sealing the furnace tube 21 is important to prevent the deterioration or combustion of the furnace tube 21, to stabilize the flow of the inert gas 23 flown into the furnace tube 21, to keep the strength of the drawn optical fiber 2, and to control the fluctuation of the outer diameter of the optical fiber 2.

As the sealing mechanism, the upper seal ring 24 is provided at an upper side of the optical fiber drawing furnace 20. The upper seal ring 24 has a ring shape, and comprises a center hole corresponding to the outer diameter of the drawing-preform 1. The upper seal ring 24 is made of a material such as carbon, carbon felt, and ceramics, in consideration of the heat resistance and the prevention of damage to the drawing perform 1.

As for the conventional upper seal ring 24, a diameter of the center hole (hereafter, referred as "inner diameter") is fixed in accordance with the outer diameter of the drawing-preform 1. To conduct the drawing by using the sealing mechanism of such shape, it is necessary to reduce the difference (variation) in the outer diameter in a longitudinal direction of the drawing-preform 1 as much as possible. Since the drawing-preform 1 is gradually inserted into the optical fiber drawing furnace 20, the center hole should have a diameter greater than the outer diameter (at a maximum part) of the drawing-preform 1 in the upper seal ring 24. Therefore, a clearance is always generated between the drawing-preform 1 and the upper seal ring 24. In such as case, when an outer diameter changing (increasing or decreasing) part of the drawing-preform 1 passes through the furnace tube 21, amount of the gas discharged from the furnace tube 21 through the clearance will be increased, and change of the pressure in the furnace tube 21 will become greater.

When using the carbon felt composed of carbon fibers for the upper seal ring 24 and the lower seal ring 25 to obtain a high sealing property, the inner diameter of the upper seal ring 24 or the lower seal ring 25 may be increased or reduced to some extent. However, when the fluctuation of the outer diameter of the drawing-preform is greater than the increase or decrease of the inner diameter of the ring, the inner diameter of the ring is extended at the maximum part of the outer diameter of the drawing-preform 1. Since there is also a limit in shrinkage of the ring thereafter, the sealing property will be lost. Further, from the viewpoint of dusting and consumption, there are a lot of disadvantages in the use of the carbon felt.

In the structure where the inert gas 23 is flown into the furnace tube 23 in an upper direction so that the inert gas 23 is discharged to the outside from the furnace tube 21 through the clearance between the drawing-preform 1 and the upper seal ring 24, when the fluctuation of the outer diameter of the drawing-preform 1 in the longitudinal direction is large in the seal ring with the fixed inner diameter, the amount of gas emission varies and the pressure in the furnace tube 21 cannot be kept constant.

Due to the deterioration of the sealing property of the furnace tube 21, the gas pressure in the furnace tube 21 is varied and a flow rate of the gas becomes unstable. As a result, the fluctuation in the outer diameter of the optical fiber is increased, the strength of the optical fiber is decreased, the optical characteristics of the optical fiber are deteriorated, and the production yield is deteriorated. In addition, if an internal pressure of the furnace tube 21 is further decreased, external air of the optical fiber drawing furnace 20 is drawn into the furnace tube 21, so that the drawing work itself will be impossible, and deterioration of the furnace tube 21 will be rapidly accelerated.

To solve such a problem, JP-A-2004-161545 proposes a method for drawing an optical fiber comprising a step of sealing a drawing furnace by blowing the gas while changing an inner diameter of an upper seal ring in accordance with change in the outer diameter of the optical fiber preform which is inserted into the drawing furnace, in order to keep a clearance between the optical fiber preform and the upper seal ring constant even if the outer diameter of the optical fiber perform is changed.

However, according to the conventional method for drawing an optical fiber disclosed by JP-A-2004-161545, the outer diameter in the longitudinal direction of the drawing-preform is previously measured and the inner diameter of the seal ring is varied based on the measured data, to keep the clearance between the drawing-preform and the inner diameter of the seal ring constant. Therefore, complex systems such as outer diameter measuring apparatus for measuring the outer diameter of the preform, driving apparatus for changing the inner diameter of the seal ring, and control mechanism therefor are required, and the problems of installation space and cost due to the enlargement of size of the drawing apparatus may be occurred.

SUMMARY OF THE INVENTION

Accordingly, it is an object of the invention to provide an optical fiber drawing apparatus, a sealing mechanism for the same, and a method for drawing an optical fiber, by which the sealing property inside the furnace tube can be maintained with a simple structure even though the difference in the outer diameter of the preform is great.

According to the first feature of the invention, an optical fiber drawing apparatus, comprises:

a furnace tube in which a drawing-preform is inserted;

a heater for heating the inserted drawing-preform;

an upper seal ring for preventing a gas from leaking outside the furnace tube; and an expansion mechanism for pressing the upper seal ring in a center direction, provided at an outer periphery of the upper seal ring.

In the optical fiber drawing apparatus, the upper seal ring may comprise an inner seal ring composed by connecting a plurality of inner seal ring pieces, and an outer seal ring composed by connecting a plurality of outer seal ring pieces, the outer seal ring being provided at an outer periphery of the inner seal ring, and a connecting part of the inner seal ring pieces and that of the outer seal ring pieces are arranged not to overlap each other.

In the optical fiber drawing apparatus, the connecting part of the inner seal ring pieces may be coaxially shifted from that of the outer seal ring pieces.

In the optical fiber drawing apparatus, the inner seal ring and the outer seal ring may be piled for two or more stages, and a connecting part between seal ring pieces at an upper stage and a connecting part between seal ring pieces at an upper stage are arranged not to overlap each other.

In the optical fiber drawing apparatus, each of the inner seal ring and the outer seal ring may comprise upper stage seal ring pieces and lower stage seal ring pieces, and a connecting part between the lower stage seal ring pieces is coaxially shifted from that at the upper stage seal ring pieces.

In the optical fiber drawing apparatus, the number of the inner seal ring pieces may be from 4 to 12.

In the optical fiber drawing apparatus, the number of the outer seal ring pieces may be from 4 to 12.

In the optical fiber drawing apparatus, the seal ring piece may comprise a convex portion at one face and a concave portion at another face, and a plurality of the seal ring pieces are connected by engaging the convex portion and the concave portion to provide a ring shape.

In the optical fiber drawing apparatus, a minimum diameter of an inner periphery of the upper seal ring closely contacting the drawing-preform may be smaller than a minimum diameter of the drawing-preform.

In the optical fiber drawing apparatus, a minimum diameter of an inner periphery of the inner seal ring closely contacting the drawing-preform may be smaller than a minimum diameter of the drawing-preform.

In the optical fiber drawing apparatus, the expansion mechanism may comprise a ring-shaped coil spring, and the coil spring makes an inner periphery of the upper seal ring uniformly contacting to the drawing-preform over a total length of the outer periphery of the upper seal ring.

In the optical fiber drawing apparatus, the expansion mechanism may comprise a ring-shaped coil spring, and the coil spring makes an inner periphery of the inner seal ring uniformly contacting to the drawing-preform over a total length of the outer periphery of the outer seal ring.

According to the second feature of the invention, a sealing mechanism for an optical fiber drawing apparatus comprises:

an inner seal ring composed by connecting a plurality of inner seal ring pieces;

an outer seal ring composed by connecting a plurality of outer seal ring pieces, the outer seal ring being provided at an outer periphery of the inner seal ring; and an expansion mechanism for pressing the upper seal ring in a center direction, provided at an outer periphery of the upper seal ring;

wherein:

the inner seal ring and the outer seal ring are piled for two or more stages, a connecting part of the inner seal ring pieces and that of the outer seal ring pieces are arranged not to overlap with each other, a connecting part between seal ring pieces at an upper stage and a connecting part between seal ring pieces at an upper stage are arranged not to overlap each other, an inner diameter of the inner seal ring is varied in accordance with an outer diameter of the drawing-preform in vertical direction, and the inner periphery of the inner seal ring is pressed by the expansion mechanism to a center direction to closely contact to the drawing-preform.

According to the third feature of the invention, a method for drawing an optical fiber, using an optical fiber drawing apparatus comprising a furnace tube, a heater, an upper seal ring, and an expansion mechanism for pressing the upper seal ring in a center direction, provided at an outer periphery of the upper seal ring, comprises the steps of:

inserting a drawing-preform in the furnace tube;

heating the inserted drawing-preform by the heater; and drawing the drawing-preform to provide an optical fiber with changing an inner diameter of the upper seal ring in accordance with an outer diameter of the drawing-preform in vertical direction.

According to the invention, it is possible to provide the optical fiber drawing apparatus, the sealing mechanism for the same, and the method for drawing an optical fiber with simple structure, by which the sealing property in the furnace tube can be maintained even if the difference of the outer diameter of the preform is large.

BRIEF DESCRIPTION OF THE DRAWINGS

Preferred embodiment according to the invention will be described in conjunction with appended drawings, wherein:

FIGS. 5A and 5B are perspective views of a seal ring piece composing the upper seal ring in the preferred embodiment according to this invention, wherein FIG. 5A shows an inner seal ring piece which composes the inner seal ring and FIG. 5B shows an outer seal ring piece which composes the outer seal ring.

DETAILED DESCRIPTION OF PREFERRED EMBODIMENT

Next, an optical fiber drawing apparatus, a sealing mechanism for the same, and a method for drawing an optical fiber in the preferred embodiment according to the present invention will be explained in more detailed in conjunction with the appended drawings.

[Total Structure of the Optical Fiber Drawing Apparatus]

Figure 1:
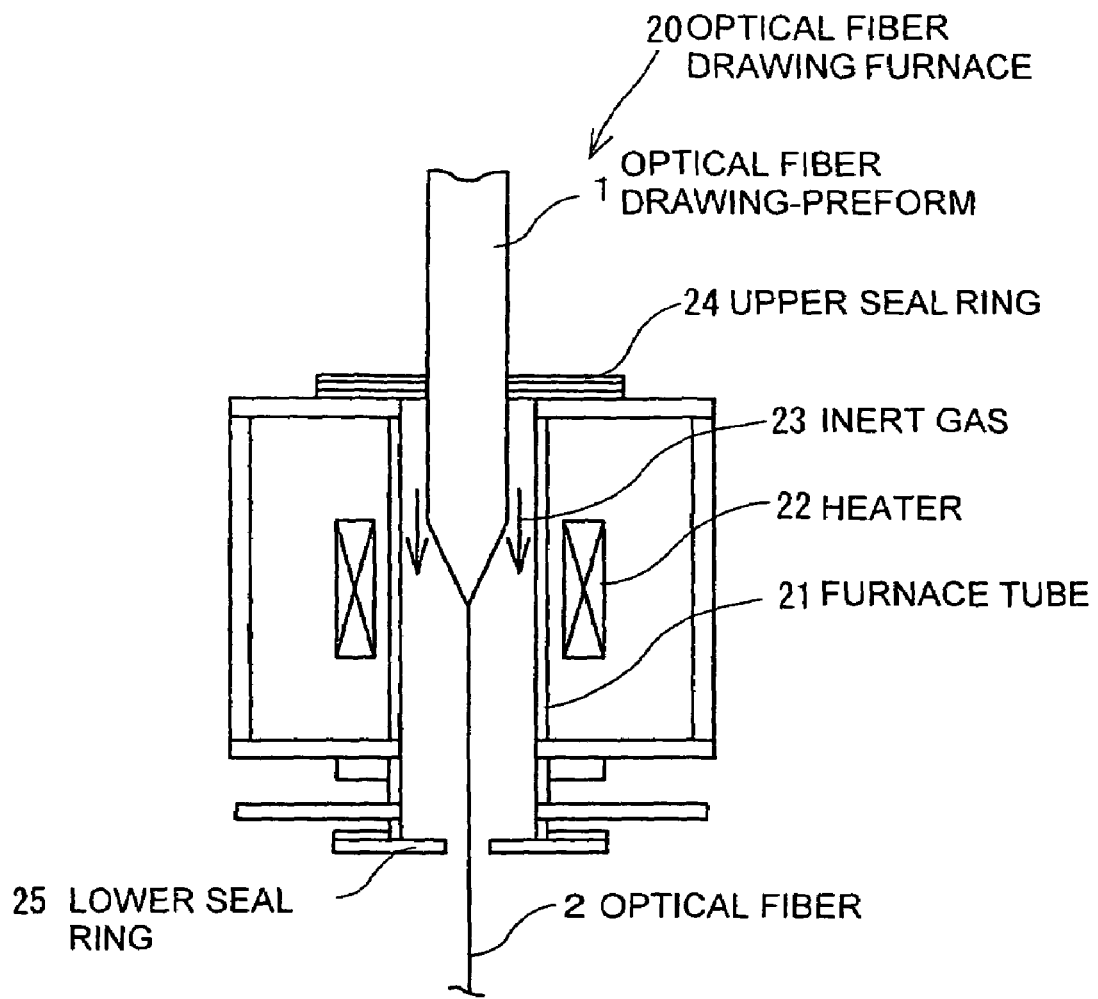
FIG. 1 is a schematic illustration showing a structure of a conventional optical fiber drawing apparatus (drawing furnace)
Figure 2:
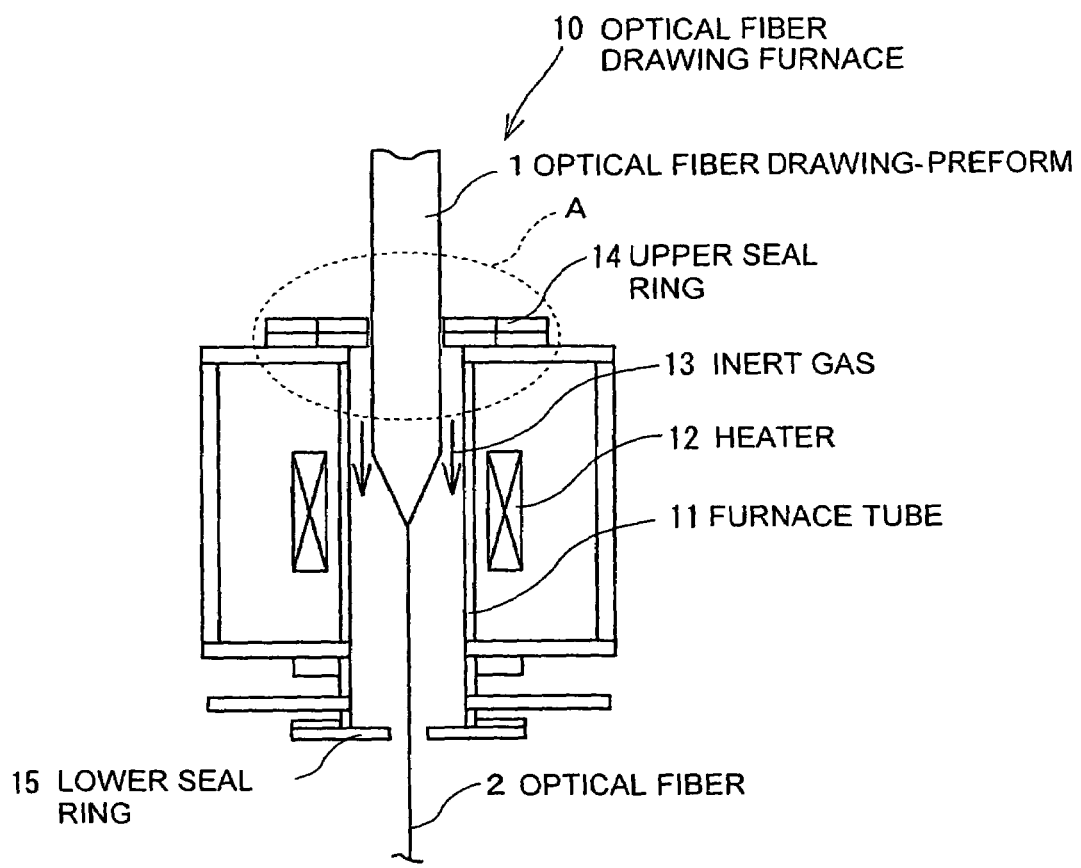
FIG. 2 is a schematic illustration showing an optical fiber drawing apparatus (drawing furnace) in a preferred embodiment according to this invention.

FIG. 2 is a schematic illustration showing the optical fiber drawing apparatus (drawing furnace) in the preferred embodiment according to this invention.

An optical fiber drawing furnace 10 mainly comprises a furnace tube 11 to which an optical fiber drawing-preform 1 is inserted, a heater 12 for heating the inserted drawing-preform 1, an upper seal ring 14 and a lower seal ring 15 which prevent inert gas 13 from leaking to the outside from the furnace tube 11. In this preferred embodiment, the optical fiber drawing furnace 10 is characterized by the structure of the upper seal ring 14.

(Composition of the Upper Seal Ring)

Figure 3:
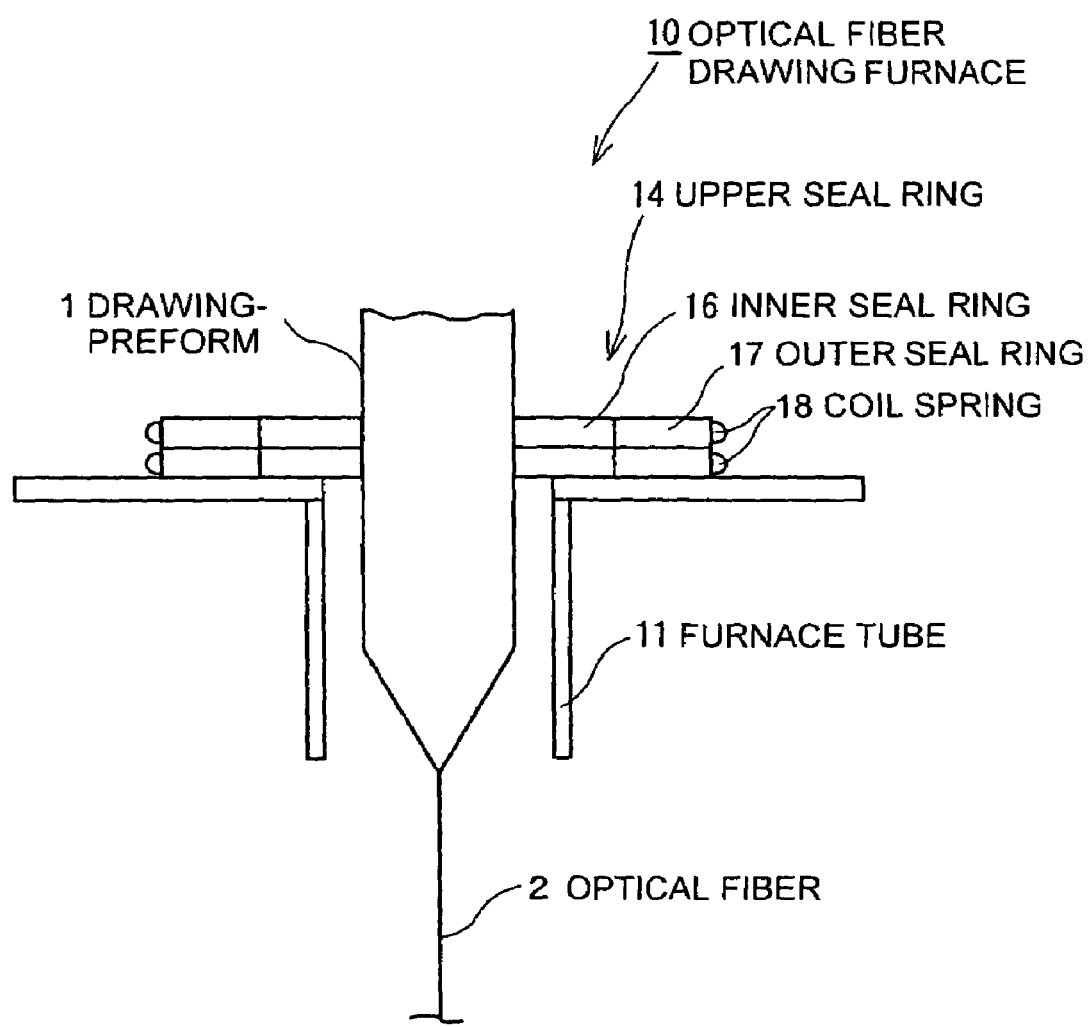
FIG. 3 is an enlarged view of a part A (an upper seal ring) in FIG. 2.
Figure 4:
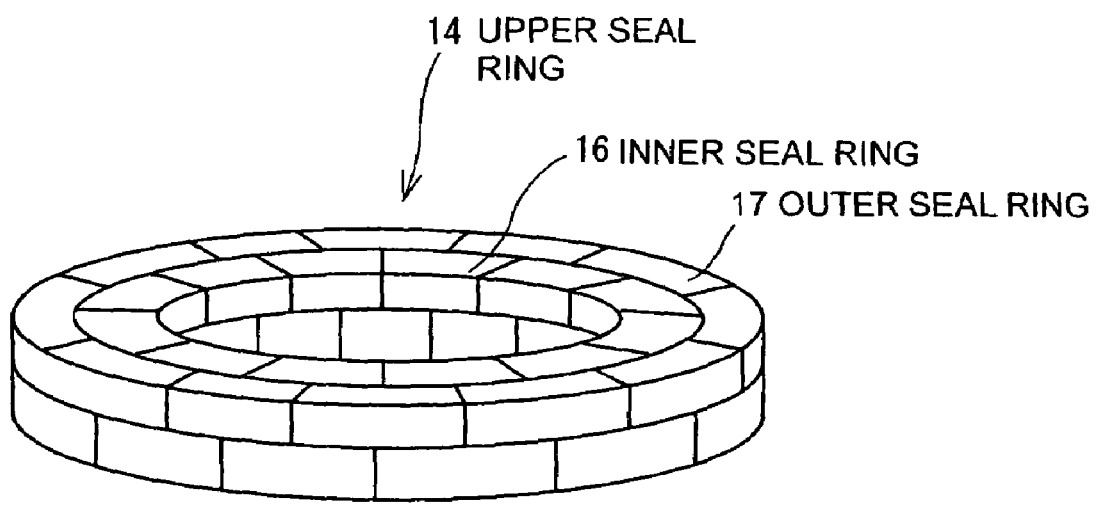
FIG. 4 is a perspective view of the upper seal ring in the preferred embodiment according to this invention.

FIG. 3 is an enlarged view of a part A (the upper seal ring 14) in FIG. 2, and FIG. 4 is a perspective view of the upper seal ring 14 in the preferred embodiment according to this invention. The upper seal ring 14 to be installed at an upper part of the furnace tube 11 comprises an inner seal ring 16 and an outer seal ring 17. Each of the inner seal ring 16 and the outer seal ring 17 comprises a lower stage seal ring and an upper stage seal ring.

At an outer periphery of the outer seal ring 17, coil springs 18 are arranged as an expansion mechanism which can freely expand and contract for pressing the upper seal ring 14 in the direction of the inner diameter. The coil spring 18 composing the expansion mechanism has a ring shape. Further, the coil spring 18 has a pressing force to closely and uniformly contact the inner periphery of the inner seal ring 16 of the upper seal ring 14 to the drawing-preform 1, in any time, over a total length of the outer periphery of the outer seal ring 17 of the upper seal ring 14. In the meantime, the length of the coil spring 18 is variable.

Figure 5A:
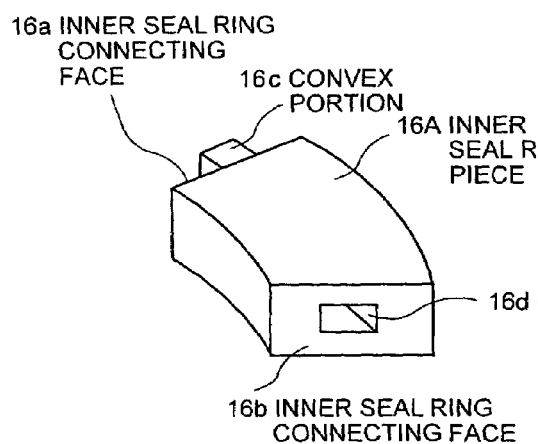
Figure 5B:
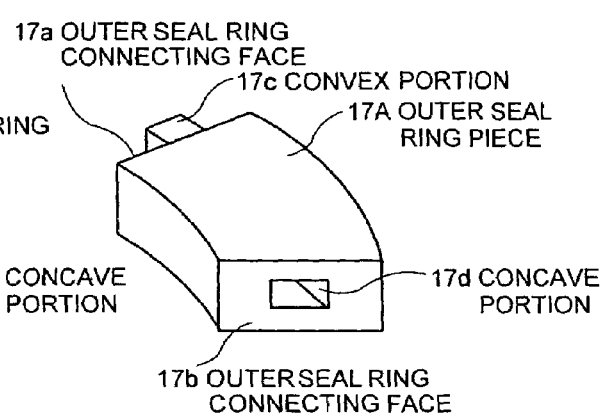

FIGS. 5A and 5B are perspective views of a seal ring piece composing the upper seal ring in the preferred embodiment according to this invention, wherein FIG. 5A shows an inner seal ring piece which composes the inner seal ring and FIG. 5B shows an outer seal ring piece which composes the outer seal ring.

The inner seal ring 16 is formed to have a ring shape by connecting a plurality of inner seal ring pieces 16A shown in FIG. 5A, so that the inner diameter of the inner seal ring 16 is variable. As for the number of the inner seal ring pieces 16A, 4 or more is preferable. More preferably, the number of the inner seal ring pieces 16A is 4 to 12.

As the connecting structure, a convex portion 16c is provided at an inner seal ring connecting face 16a at one side of the inner seal ring piece 16A, and a concave portion 16d of which size is greater than the convex portion 16c is provided at an inner seal ring connecting face 16b at another side, so that the convex portion 16c can be easily inserted and removed. The inner seal ring piece 16A can be connected by inserting the convex portion 16c in the concave portion 16d of an adjacent inner seal ring piece 16A. A length of the convex portion 16c and a depth of the concave portion 16d are set to be greater than a maximum difference in the outer diameter in a vertical direction (i.e. a difference between a maximum diameter and a minimum diameter) of the drawing-preform 1, so that the adjacent inner seal ring pieces 16A may not be disconnected when the inner seal ring 16 contacts the maximum diameter part of the drawing-perform 1. It is preferable that the length of the convex portion 16c and the depth of the concave portion 16d are within two times of the difference in the outer diameter. Other connecting structures are also applicable provided that the inner diameter of the ring is variable.

The inner seal ring 16, constituted by connecting the inner seal ring pieces 16A to have a ring shape, has an inner diameter that is equal to or smaller than the minimum diameter of the drawing-preform 1 except a tip end portion and a terminal portion. Preferably, when the ring shape is formed by connecting the inner seal ring pieces 16A, a curvature of a part closely contacting with the drawing-preform 1 is determined to provide a radius that can constitute the inner diameter smaller by about several millimeters than the minimum diameter of the drawing-preform 1.

When the drawing-preform 1 is inserted into the inner seal ring 16 and moved in a drawing direction in the state where the inner periphery of the inner seal ring 16 is closely contacted to the outer periphery of the drawing-preform 1, the variation of clearance is occurred in accordance with the diameter of the drawing-preform 1, so that the inner diameter of the inner seal ring 16 is increased and reduced. At this time, since each of the inner seal ring pieces 16A is pressed against the drawing-preform 1 by the coil spring 18 (since the pressing force acts in a center direction of the inner seal ring 16), the inner seal ring pieces 16A will not be disassembled due to the disconnection.

At an outer periphery of the inner seal ring 16, the outer seal ring 17 is formed to have a ring shape by connecting a plurality of inner seal ring pieces 17A shown in FIG. 5B, so that the inner diameter of the outer seal ring 17 is variable. As for the number of the outer seal ring pieces 17A, 4 or more is preferable. More preferably, the number of the outer seal ring pieces 17A is 4 to 12.

As the connecting structure, a convex portion 17c is provided at an outer seal ring connecting face 17a at one side of the outer seal ring piece 17A, and a concave portion 17d of which size is greater than the convex portion 16c is provided at an outer seal ring connecting face 17b at another side, so that the convex portion 17c can be easily inserted and removed. The outer seal ring piece 17A can be connected by inserting the convex portion 17c in the concave portion 17d of an adjacent outer seal ring piece 17A. A length of the convex portion 17c and a depth of the concave portion 17d are set to be greater than a maximum difference in the outer diameter in a vertical direction (i.e. a difference between a maximum diameter and a minimum diameter) of the drawing-preform 1, so that the adjacent outer seal ring pieces 17A may not be disconnected when the outer seal ring 17 contacts the maximum diameter part of the drawing-perform 1. It is preferable that the length of the convex portion 17c and the depth of the concave portion 17d are within two times of the difference in the outer diameter. Other connecting structures are also applicable provided that the inner diameter of the ring is variable.

Variation of the clearance is occurred between the outer seal ring connecting face 17a and the outer seal ring connecting face 17d in accordance with the expansion and contraction of the inner diameter of the inner seal ring 16, so that the inner diameter of the outer seal ring 17 can be increased and reduced. At this time, since each of the outer seal ring pieces 17A is pressed against the inner seal ring 16, namely the drawing-preform 1, by the coil spring 18, the outer seal ring pieces 17A will not be disassembled due to the disconnection.

When connecting, a connecting part between the outer seal ring connecting faces 17a and 17b of the outer seal ring 17 is arranged not to overlap with a connecting part between the inner seal ring connecting faces 16a and 16b of the inner seal ring 16 for maintaining the sealing property. In other words, the connecting part between the outer seal ring pieces 17A is coaxially shifted from the connecting part between the inner seal ring pieces 16B. Further, the connecting parts are construed such that clearances occurred between the outer seal ring connecting faces 17a and 17b of the outer seal ring 17 do not overlap clearances between the inner seal ring connecting faces 16a and 16b of the inner seal ring 16 even when the inner diameter is increased. It is preferable to locate the connecting part between the outer seal ring connecting faces 17a and 17b on a substantially center part of the outer periphery of the inner seal ring piece 16A.

A further seal ring same as the inner seal ring 16 or the outer seal ring 17 may be provided at the outer periphery of the outer seal ring 17 to provide the triple or more seal ring structure. In this case, the inner seal ring 17, the outer seal ring 17 and the outermost seal ring are arranged so that the connecting part (seam joint) of seal ring pieces of the outermost seal ring do not overlap the seal ring pieces of the seal ring located inside and directly contacting the outermost seal ring, similarly to the double seal ring structure. At this time, the coil spring 18 is provided at the outer periphery of the outermost seal ring, so that all the seal ring pieces are pressed against the center direction of the ring uniformly to provide a retractable mechanism.

As shown in FIG. 4, the inner seal ring 16 and the outer seal ring 17 are piled for two or more stages respectively. When connecting, the inner seal ring pieces 16A of the inner seal ring 16 at an upper stage and a lower stage are arranged such that the connecting parts (seam joints) therebetween do not overlap with each other for maintaining the sealing property, and that clearances occurred between connecting faces at the upper stage and the lower stage do not overlap with each other even when the inner diameter is increased. It is preferable to pile the inner seal ring pieces 16A, such that the connecting part between the inner seal ring connecting faces 16*a* and 16*b* at the upper stage locates in a substantially center part of an upper surface of the inner seal ring pieces 16A at the lower stage. The outer seal ring pieces 17A of the outer seal ring 17 at an upper stage and a lower stage are also piled such that the connecting parts (seam joints) therebetween do not overlap with each other, similarly to the inner seal ring 16.

The inner seal ring 16 and the outer seal ring 17 can be piled to provide a triple or more stage structure. In this case, the connecting parts between the seal ring pieces at one stage and another stage directly provided thereon do not overlap with each other, similarly to the double stage structure.

According to the above structure, even if the drawing-preform 1 is inserted into the furnace tube 11 and moved downward so that the drawing-preform 1 having the varying outer diameter contacts the seal ring, the inner diameter of the seal ring can be easily varied in accordance with the outer diameter of the drawing-preform 1, thereby closely contacting the inner seal ring 16 to the drawing-preform 1 in any time.

Further, since the connecting parts (seam joints) of the seal ring which is expanded by the drawing-preform 1 are arranged in staggered position respectively in both the circumferential direction and the vertical direction, the leakage of the inert gas 13 from the clearance at the connecting parts (seam joints) can be prevented and the gas sealing property inside the furnace tube 11 can be highly maintained.

EFFECT OF THE PREFERRED EMBODIMENT

According to the preferred embodiment, the following effects can be achieved.

(1) It is possible to maintain the high sealing property inside the optical fiber drawing furnace during the drawing work of the drawing-preform in which the difference in the outer diameter in the vertical direction is large.

(2) It is possible to remarkably decrease the adverse affects such as the fluctuation of the outer diameter of the optical fiber, the generation of a low strength part of the optical fiber due to the deterioration of parts inside the optical drawing-preform furnace, caused by the turbulence or imbalance of the inert gas flow inside the optical fiber drawing furnace induced by the deterioration of the sealing property inside the optical fiber drawing furnace.

(3) It is possible to provide a compact size apparatus with the improved workability. In addition, the excellent sealing property inside the optical fiber drawing furnace can be maintained, and the pressure inside the optical fiber drawing furnace can be kept constant.

(4) The quality of the optical fiber can be improved and the decrease of the production yield and the increase of maintenance cost can be suppressed.

Although this invention is further explained in detail as below based on the embodiments, this invention is not to be considered limited to these embodiments.

EMBODIMENT

The upper seal ring 14 is manufactured as follows. The inner seal ring 16 attached to the drawing-preform 1 is made of graphite in consideration of the prevention of external damages to the glass-preform and the heat resistance. The outer seal ring 17 is made of ceramics in consideration of the heat shield to the coil spring 18 provided at the outer periphery of the outer seal ring 17.

When the ring shape is formed by connecting the inner seal ring pieces 16A, a curvature of a part closely contacting with the drawing-preform 1 is determined to provide a radius that can constitute the inner diameter smaller by about 2 mm than the minimum diameter of the drawing-preform 1. The curvature of an inner periphery part of the outer seal ring piece 17A is conformed to the curvature of an outer periphery part of the inner seal ring piece 16A.

12 pieces of the inner seal ring pieces 16A and the outer seal ring pieces 17A were prepared, respectively, the inner seal ring 16 and the outer seal ring 17 are arranged to provide a ring shape such that the connecting parts between the adjacent inner seal ring pieces 16A and the connecting parts between the adjacent outer seal ring pieces 17A are located in staggered position when connected. As a result, although the inert gas 13 in the furnace tube 11 is flown into the clearance between the connecting faces 16*a* and 16*b* of the inner seal ring pieces 16A in the diametrical direction, the flow of the inert gas 13 is stopped in the inner diameter part of the outer seal ring pieces 17A.

A groove is provided at the outer periphery part of the outer seal ring 17 made of ceramics, and the coil spring 18 made of stainless steel with a ring shape is disposed in this groove in some expanded state. Therefore, the pressing force acts constantly on the seal ring in the direction of the inner diameter.

As shown in FIG. 5, the convex portion 16*c* and the concave portion 16*d* are formed on the both end surfaces of the inner seal ring 16A, respectively, and the adjacent inner seal ring pieces 16A are engaged with each other at the convex and concave portions to be connected in the ring shape. Therefore, clearances are provided with almost constant intervals between the connecting when the drawing-preform 1 is inserted in the inner diameter part. Further, even if the outer diameter of the drawing-preform 1 becomes minimum, the inner seal ring piece 16A will not drop off and the ring shape can be maintained.

Further, another unit comprising the inner seal ring 16, the outer seal ring 17, and the coil spring 18 is prepared for one stage, to provide the double stage seal ring structure. In this case, the lower and upper stage seal rings are located such that the connecting faces of the lower and upper stage seal rings do not overlap with each other. In other words, the connecting faces of the lower stage seal ring are coaxially shifted from those of the upper stage seal ring. Therefore, the inert gas 13 inside the optical fiber drawing furnace 10 leaked to the connecting parts at the lower stage can be stopped in the vertical direction at the upper stage seal ring.

The inert gas 13 flown into the furnace tube 11 is discharged to the outside from the optical fiber drawing furnace 10 through a discharge path (not shown) and an automatic control valve (not shown). The pressure in the furnace tube 11 can be kept at a predetermined pressure by the automatic control valve.

The upper seal ring 14 thus manufactured is located on a flat surface of an upper part of the optical fiber drawing furnace 10. After passing through a center hole of the upper seal ring 14, the drawing-preform 1 is inserted into the furnace tube 11 which is heated by the heater 12 and drawn to an optical fiber 2. Even when the difference in the outer diameter of the drawing-preform 1 in the vertical direction is more than 5 mm, the pressure in the furnace tube 11 can be stabilized and the sealing property can be kept high.

Since the temperature inside the optical fiber drawing furnace 10 may be from 2200° C. to 2300° C. for melting the drawing-preform 1, there is concern of the consumption and deterioration of the seal ring 14. However, it is confirmed that the outer seal ring 17 made of ceramics and the coil spring 18 can withstand continuous operations for 6 months or more by providing following elements. In concrete, a cover made of the stainless steel is provided over the inner seal ring 16 made of graphite for wrapping the sealing structure, and the cover of the stainless steel has an inner diameter in which the drawing-preform 1 can be inserted. Further, nitrogen gas is flown into the optical fiber drawing furnace 10 as the inert 13, so that the pressure inside the drawing furnace 10 is positive pressure. In the meantime, the flat part of the inner seal ring 16 on which the upper seal ring 14 is located is construed as a water-cooled mechanism.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching herein set forth.

What is claimed is:

1. An optical fiber drawing apparatus, comprising:
a furnace tube in which a drawing-preform is inserted;
a heater for heating the inserted drawing-preform;
an upper seal ring for preventing a gas from leaking outside the furnace tube; and
an expansion mechanism for pressing the upper seal ring in a center direction, provided at an outer periphery of the upper seal ring,
wherein the expansion mechanism comprises a ring-shaped coil spring, and the coil spring makes an inner periphery of the upper seal ring uniformly contacting to the drawing-preform over a total length of the outer periphery of the upper seal ring.

2. The optical fiber drawing apparatus, according to claim 1, wherein:
a minimum diameter of an inner periphery of the upper seal ring closely contacting the drawing-preform is smaller than a minimum diameter of the drawing-preform.

3. An optical fiber drawing apparatus, comprising:
a furnace tube in which a drawing-preform is inserted;
a heater for heating the inserted drawing-preform;
an upper seal ring for preventing a gas from leaking outside the furnace tube; and
an expansion mechanism for pressing the upper seal ring in a center direction, provided at an outer periphery of the upper seal ring,
wherein the upper seal ring comprises an inner seal ring composed by connecting a plurality of inner seal ring pieces, and an outer seal ring composed by connecting a plurality of outer seal ring pieces, the outer seal ring being provided at an outer periphery of the inner seal ring, and a connecting part of the inner seal ring pieces and that of the outer seal ring pieces are arranged not to overlap each other, and
wherein the expansion mechanism comprises a ring-shaped coil spring, and the coil spring makes an inner periphery of the inner seal ring uniformly contacting to the drawing-preform over a total length of the outer periphery of the outer seal ring.

4. The optical fiber drawing apparatus, according to claim 3, wherein:
the connecting part of the inner seal ring pieces is coaxially shifted from that of the outer seal ring pieces.

5. The optical fiber drawing apparatus, according to claim 3, wherein:
the inner seal ring and the outer seal ring are piled for two or more stages, and a connecting part between seal ring pieces at an upper stage and a connecting part between seal ring pieces at a lower stage are arranged not to overlap each other.

6. The optical fiber drawing apparatus, according to claim 3, wherein:
each of the inner seal ring and the outer seal ring comprises upper stage seal ring pieces and lower stage seal ring pieces, and a connecting part between the lower stage seal ring pieces is coaxially shifted from that at the upper stage seal ring pieces.

7. The optical fiber drawing apparatus, according to claim 3, wherein:
the number of the inner seal ring pieces is from 4 to 12.

8. The optical fiber drawing apparatus, according to claim 3, wherein:
the number of the outer seal ring pieces is from 4 to 12.

9. The optical fiber drawing apparatus, according to claim 3, wherein:
the seal ring piece comprises a convex portion at one face and a concave portion at another face, and a plurality of the seal ring pieces are connected by engaging the convex portion and the concave portion to provide a ring shape.

10. The optical fiber drawing apparatus, according to claim 3, wherein:
a minimum diameter of an inner periphery of the inner seal ring closely contacting the drawing-preform is smaller than a minimum diameter of the drawing-preform.

11. A sealing mechanism for an optical fiber drawing apparatus, comprising:
an inner seal ring composed by connecting a plurality of inner seal ring pieces;
an outer seal ring composed by connecting a plurality of outer seal ring pieces, the outer seal ring being provided at an outer periphery of the inner seal ring; and
an expansion mechanism for pressing the inner seal ring in a center direction, provided at an outer periphery of the inner seal ring;
wherein:
the inner seal ring and the outer seal ring are piled for two or more stages,
a connecting part of the inner seal ring pieces and that of the outer seal ring pieces are arranged not to overlap with each other,
a connecting part between seal ring pieces at an upper stage and a connecting part between seal ring pieces at a lower stage are arranged not to overlap each other, an inner diameter of the inner seal ring is varied in accordance with an outer diameter of the drawing-preform in vertical direction, the inner periphery of the inner seal ring is pressed by the expansion mechanism to a center direction to closely contact to the drawing-preform, and the expansion mechanism comprises a ring-shaped coil spring, and the coil spring makes an inner periphery of the inner seal ring uniformly contacting to the drawing-preform over a total length of the outer periphery of the inner seal ring.

* * * * *